US009615289B2

(12) United States Patent
Park

(10) Patent No.: US 9,615,289 B2
(45) Date of Patent: Apr. 4, 2017

(54) METHOD FOR CONTROLLING UPLINK TRANSMISSION IN MOBILE COMMUNICATION NETWORK AND APPARATUS THEREFOR

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 37 days.

(21) Appl. No.: 14/410,194

(22) PCT Filed: Jul. 3, 2013

(86) PCT No.: PCT/KR2013/005885
§ 371 (c)(1),
(2) Date: Apr. 22, 2015

(87) PCT Pub. No.: WO2014/007531
PCT Pub. Date: Jan. 9, 2014

(65) Prior Publication Data
US 2015/0270868 A1     Sep. 24, 2015

(30) Foreign Application Priority Data

Jul. 5, 2012   (KR) .......................... 10-2012-0073289
May 21, 2013  (KR) .......................... 10-2013-0056971

(51) Int. Cl.
*H04J 3/14*   (2006.01)
*H04W 28/02*  (2009.01)
(Continued)

(52) U.S. Cl.
CPC ...... *H04W 28/0289* (2013.01); *H04B 1/7143* (2013.01); *H04B 1/7156* (2013.01); *H04W 76/02* (2013.01); *H04W 72/1289* (2013.01)

(58) Field of Classification Search
CPC .. H04B 1/713; H04W 76/02; H04W 72/0453; H04W 28/0289; H04W 84/042
(Continued)

(56) References Cited

U.S. PATENT DOCUMENTS

2009/0232095 A1  9/2009 Ahn et al.
2010/0085956 A1  4/2010 Ahn et al.
(Continued)

FOREIGN PATENT DOCUMENTS

KR  10-2009-0033802 A  4/2009
KR  10-2009-0094743 A  9/2009
(Continued)

*Primary Examiner* — Ricky Ngo
*Assistant Examiner* — Wei-Po Kao
(74) *Attorney, Agent, or Firm* — IP Legal Services, LLC

(57) ABSTRACT

The present disclosure relates to a method for controlling uplink transmission and an apparatus therefor. The method for enabling a transmission point to control the uplink transmission in a mobile communication network, according to one embodiment of the present disclosure, includes the steps of: generating first configuration information for indicating a frequency hopping to be applied to the uplink transmission of a terminal; and transmitting, to the terminal, a first signal having the first configuration information, wherein a reception point is different from the transmission point, and the reception point receives a second signal to which the first configuration information is applied from the terminal.

18 Claims, 13 Drawing Sheets

(51) Int. Cl.
*H04W 76/02* (2009.01)
*H04B 1/7143* (2011.01)
*H04B 1/7156* (2011.01)
*H04W 72/12* (2009.01)

(58) Field of Classification Search
USPC .................................................. 370/310–350
See application file for complete search history.

(56) References Cited

U.S. PATENT DOCUMENTS

| | | |
|---|---|---|
| 2010/0284363 A1 | 11/2010 | Ahn et al. |
| 2011/0244877 A1 | 10/2011 | Farajidana et al. |
| 2012/0076106 A1 | 3/2012 | Bhattad et al. |
| 2012/0113967 A1 | 5/2012 | Smith et al. |
| 2012/0184206 A1 | 7/2012 | Kim et al. |
| 2012/0263142 A1 | 10/2012 | Ahn et al. |
| 2012/0309405 A1* | 12/2012 | Parkvall ................ H04W 48/08 455/452.1 |
| 2013/0022012 A1 | 1/2013 | Lee et al. |
| 2013/0121266 A1 | 5/2013 | Ko et al. |
| 2013/0201931 A1 | 8/2013 | Noh et al. |
| 2014/0314026 A1 | 10/2014 | Ko et al. |
| 2014/0321510 A1 | 10/2014 | Ahn et al. |
| 2015/0270938 A1 | 9/2015 | Noh et al. |

FOREIGN PATENT DOCUMENTS

| | | |
|---|---|---|
| KR | 10-2011-0113596 A | 10/2011 |
| KR | 10-2011-0125618 A | 11/2011 |
| WO | 2011/071329 A2 | 6/2011 |

* cited by examiner

FIG.1

```
PUSCH-ConfigCommon ::=     SEQUENCE {
    pusch-ConfigBasic          SEQUENCE {
        n-SB                       INTEGER (1..4),
        hoppingMode                ENUMERATED {interSubFrame, intraAndInterSubFrame},
        pusch-HoppingOffset        INTEGER (0..98),
        enable64QAM                BOOLEAN
    },
    ul-ReferenceSignalsPUSCH   UL-ReferenceSignalsPUSCH
}
```

METHOD FOR CONTROLLING UPLINK TRANSMISSION IN MOBILE COMMUNICATION NETWORK AND APPARATUS THEREFOR

CROSS-REFERENCE TO RELATED APPLICATION

This application is a National Stage Patent Application of PCT International Patent Application No. PCT/KR2013/005885 (filed on Jul. 3, 2013) under 35 U.S.C §371,which claims priority to Korean Patent Application Nos. 10-2012-0073289(filed on Jul. 5, 2012) and No. 10-2013-0056971 (filed on May 21, 2013 ), the teachings of which are incorporated herein in their entireties by reference.

TECHNICAL FIELD

The present disclosure relates to a method and an apparatus for controlling uplink transmission in a mobile communication network. More particularly, the present disclosure relates to a technology for controlling uplink transmission when a transmission point is different from a reception point.

BACKGROUND ART

With the progress of communication systems, a wide variety of wireless terminals have been introduced to consumers such as companies and individuals. A current mobile communication system affiliated with Third Generation Partnership Project (3GPP), for example, Long Term Evolution (LTE), LTE-Advanced (LTE-A), and the like, is a high-speed and high-capacity communication system capable of transmitting and receiving various data, such as image data, wireless data, and the like, beyond providing voice-oriented services. Accordingly, the current mobile communication system needs to develop a technology capable of transmitting a large amount of data coming close to the amount of data transmitted through a wired communication network. As a scheme for transmitting a large amount of data, there is a scheme for efficiently transmitting data by multiple cells. However, when data is transmitted by multiple cells or multiple transmission/reception points, collision between signals may occur, and thus problems may arise.

DETAILED DESCRIPTION OF THE INVENTION

Technical Problem

In order to solve the above-mentioned problems, an aspect of the present disclosure is to propose a technology for controlling uplink transmission in a mobile communication network where a transmission point is different from a reception point. More specifically, a technology for avoiding collision in an uplink when a transmission point is different from a reception point is proposed.

Also, another aspect of the present disclosure is to enable a transmission point to provide information to a user equipment in order to prevent uplink collision from occurring between the user equipment and another user equipment at a reception point.

Technical Solution

The present disclosure provides a method and an apparatus for transmitting a Physical Uplink Shared Channel (PUSCH) for a user equipment when a transmission point (TP: e.g., eNB/RU/RRH) for a downlink physical channel and a downlink signal of the user equipment is different from a reception point (RP: e.g., eNB/RU/RRH) for an uplink physical channel and an uplink signal of the user equipment.

In accordance with an aspect of the present disclosure, there is provided a method for controlling uplink transmission in a mobile communication network by a transmission point. The method includes: generating first configuration information indicating frequency hopping to be applied to uplink transmission of a user equipment; and transmitting a first signal including the first configuration information to the user equipment, wherein a reception point is different from the transmission point and receives, from the user equipment, a second signal to which the first configuration information is applied.

In accordance with another aspect of the present disclosure, there is provided a method for controlling uplink transmission in a mobile communication network by a user equipment. The method includes: receiving, by the user equipment, first configuration information indicating frequency hopping to be applied to uplink transmission from a transmission point; and transmitting, by the user equipment, a second signal, to which the first configuration information is applied, to a reception point different from the transmission point.

In accordance with still another aspect of the present disclosure, there is provided a transmission point which includes: a reception unit, a control unit, and a transmission unit. The reception unit is configured to receive a signal from a user equipment. The control unit is configured to generate first configuration information indicating frequency hopping to be applied to uplink transmission by the user equipment. The transmission unit is configured to transmit a first signal including the first configuration information to the user equipment. A reception point is different from the transmission point and receives, from the user equipment, a second signal to which the first configuration information is applied.

In accordance with yet another aspect of the present disclosure, there is provided a user equipment which includes: a transmission unit configured to transmit a signal; a reception unit configured to receive first configuration information indicating frequency hopping to be applied to uplink transmission from a transmission point; and a control unit configured to generate a second signal to which the first configuration information is applied. The transmission unit transmits a second signal to a reception point different from the transmission point.

Advantageous Effects

In embodiments of the present disclosure, uplink transmission is controlled in a mobile communication network where a transmission point is different from a reception point. More specifically, uplink collision can be avoided when the transmission point is different from the reception point.

BRIEF DESCRIPTION OF THE DRAWINGS

FIG. 1 illustrates a PUSCH-ConfigCommon Information Element (IE).

MODE FOR CARRYING OUT THE INVENTION

Figure 2:
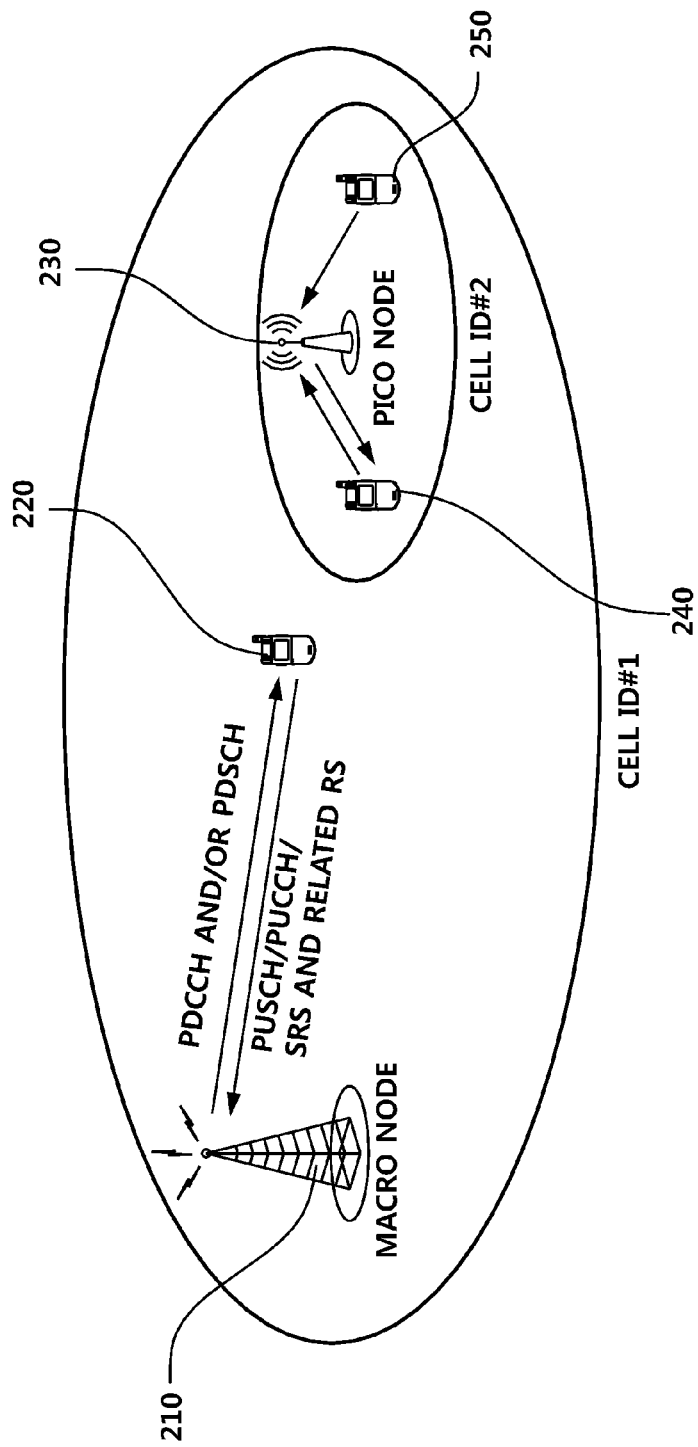
FIG. 2 illustrates a communication environment where a downlink transmission point (TP) for a user equipment is identical to an uplink reception point (RP) therefor.

Hereinafter, exemplary embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed to provide various types of communication services, such as a voice service, a packet data service, and the like. The wireless communication system may include a User Equipment (UE) and a Base Station (BS or eNB). Throughout the specifications, the user equipment may be an inclusive concept indicating a user terminal utilized in wireless communication, including a User Equipment (UE) in wideband code division multiple access (WCDMA), long term evolution (LTE), high speed packet access (HSPA), and the like, and an Mobile station (MS), a User Terminal (UT), an Subscriber Station (SS), a wireless device, and the like in global systems for mobile communication (GSM).

A base station or a cell may generally refer to a station where communication with the user equipment is performed. The base station may also be referred to as a Node-B, an evolved Node-B (eNB), a Sector, a Site, a Base Transceiver System (BTS), an Access Point, a Relay Node, an Remote radio head (RRH), and the like.

That is, the base station 20 or the cell may be construed as an inclusive concept indicating a portion of an area covered by a Base Station Controller (BSC) in code division multiple access (CDMA), a NodeB in Wideband CDMA (WCDMA), an eNB or a sector (site) in LTE, and the like, and the concept may include various coverage areas, such as a megacell, a macrocell, a microcell, a picocell, a femtocell, a communication range of a relay node, and the like.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, the Uplink (UL) refers to a scheme of performing transmission and reception of data by the user equipment with respect to the base station, and Downlink (DL) refers to a scheme of performing transmission and reception of data by the base station with respect to the user equipment.

Varied multiple access schemes may be unrestrictedly applied to the wireless communication system. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a Time Division Duplex (TDD) scheme that performs transmission based on different times, or based on an Frequency Division Duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), a Physical Control Format Indicator Channel (PCFICH), a Physical Hybrid ARQ Indicator Channel (PHICH), a Physical Uplink Control Channel (PUCCH), and the like, and may be configured as a data channel, such as a Physical Downlink Shared Channel (PDSCH), a Physical Uplink Shared Channel (PUSCH), and the like, so as to transmit data.

In this specification, a cell may denote coverage of a signal transmitted by a transmission/reception point, a component carrier having coverage of a signal transmitted by one of a transmission point and the transmission/reception point, or the transmission/reception point itself.

In accordance with at least one embodiment, a wireless communication system may be a COordinated Multi-Point transmission/reception system (CoMP system) a coordinated multi-antenna transmission system, or a coordinated multi-cell communication system, where two or more transmission/reception points cooperatively transmit a signal. The CoMP system may include at least two multiple transmission/reception points and UEs.

The multiple transmission/reception points may be a base station, a macrocell (e.g., eNB), or at least one RRH that is connected to and controlled by an eNB through an optical cable or an optical fiber and has high transmission power or has low transmission power in an macrocell area.

Hereinafter, the term "downlink (DL)" refers to communication or a communication path from the multiple transmission/reception points to a UE, and the term "uplink (UL)" refers to communication or a communication path from the UE to the multiple transmission/reception points. In the DL, a transmitter may be a part of the multiple transmission/reception points, and a receiver may be a part of the UE. In the UL, a transmitter may be a part of the UE, and a receiver may be a part of the multiple transmission/reception points.

Hereinafter, signal transmission and signal reception through a channel such as a PUCCH, a PUSCH, a PDCCH, or a PDSCH, will be expressed as the transmission and reception of a PUCCH, a PUSCH, a PDCCH, or a PDSCH.

The eNB performs DL transmission to the UEs. The eNB may transmit a Physical Downlink Shared CHannel (PDSCH) and a Physical Downlink Control Channel (PDCCH). The PDSCH is a main physical channel for unicast transmission. The PDCCH is for transmitting DL control information such as scheduling required to receive a PDSCH and scheduling grant information for transmission through a UL data channel (e.g., a Physical Uplink Shared CHannel (PUSCH)). Hereinafter, the transmission and reception of signals through each channel will be described as the transmission and reception of the relevant channel.

A first UE (UE1) may transmit a UL signal to an eNB and a second UE may transmit a UL signal to an RRH, as described below with reference to the accompanying drawings.

For the purpose of obtaining inter-cell interference randomization and frequency diversity gain for UL data transmission in the 3GPP LTE/LTE-A system, a signaling scheme and a UE operation scheme thereof are defined for applying inter-subframe or intra & inter subframe frequency hopping when a PUSCH is transmitted. An LTE/LTE-A UE is defined to perform related operations based on a parameter related to PUSCH frequency hopping configured through higher layer signaling (e.g., Radio Resource Control (RRC) signaling) from the eNB. Such an LTE/LTE-A UE is defined to apply slot hopping or inter-subframe hopping when a PUSCH is transmitted according to set values of a frequency hopping flag and hopping information bit(s) transmitted through a UL scheduling grant transmitted through a PDCCH.

To this end, a UE in a cell/eNB/RU/RRH sets cell-specific RRC parameters related to PUSCH frequency hopping. A PUSCH-config information element (IE) is one of parameters related to the PUSCH frequency hopping related cell-specific RRC parameter. Such a PUSCH-config IE is illustrated in FIG. 1.

FIG. 1 illustrates a PUSCH-ConfigCommon Information Element (IE).

Referring to FIG. 1, PUSCH frequency hopping-related cell-specific RRC parameters are:

1) n-SB ($N_{sb}$) for representing the number of sub-bands,
2) hoppingMode for indicating inter-subframe hopping or intra & inter-subframe hopping, and
3) pusch-HoppingOffset ($N_{RB}^{HO}$) for indicating a PUSCH frequency hopping type (e.g., 1 or 2).

System information of a target cell may be optionally included in 'RRCConnectionReconfiguration' signaling. Except such a case, the PUSCH frequency hopping-related cell-specific RRC parameters are acquired through the reception of System Information Block 2 (SIB2) which is broadcasted from a cell/eNB/RU/RRH to UEs in the cell in handover of user equipment. When PUSCH frequency hopping is applied through a UL scheduling grant, all the UEs in the cell apply inter-subframe hopping or intra & inter subframe hopping according to an identical hopping rule, which is defined on the basis of an identical frequency hopping parameter, based on the acquired PUSCH frequency hopping-related cell-specific RRC parameters.

A PUSCH resource mapping rule and a PUSCH hopping procedure of a UE are related to the hopping parameter transmitted through the UL scheduling grant. Hereinafter, such a rule and procedure will be described in detail.

Parameters necessary for frequency hopping are calculated using Equation 1 below.

[Equation 1]

$$\tilde{n}_{PRB}(n_s) = (\tilde{n}_{VRB} + f_{hop}(i) \cdot N_{RB}^{sb} + ((N_{RB}^{sb} - 1) - 2(\tilde{n}_{VRB} \bmod N_{RB}^{sb})) \cdot f_m(i)) \quad (1)$$
$$\bmod(N_{RB}^{sb} \cdot N_{sb})$$

$$i = \begin{cases} \lfloor n_s/2 \rfloor & \text{inter-subframe-hopping} \\ n_s & \text{intra-\&-inter-subframe-frequency-hopping} \end{cases}$$

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases}$$

$n_{VRB}$ : being-acquired-from-scheduling-grant $N_{RB}^{HO}$ : PUSCH – HoppingOffset-parameter-provided-through-higher layer signaling $N_{sb}$ : the-number-of-sub-bands Functions related to hopping are expressed by Equation (2) below.

[Equation 2]

$$f_{hop}(i) = \begin{cases} 0 & N_{sb} = 1 \\ \left( f_{hop}(i-1) + \sum_{k=i\cdot 10+1}^{i\cdot 10+9} c(k) \times 2^{k-(i\cdot 10+1)} \right) \bmod N_{sb} & N_{sb} = 2 \\ \left( f_{hop}(i-1) + \left( \sum_{k=i\cdot 10+1}^{i\cdot 10+9} c(k) \times 2^{k-(i\cdot 10+1)} \right) \bmod(N_{sb} - 1) + 1 \right) \bmod N_{sb} & N_{sb} > 2 \end{cases} \quad (2)$$

$$f_m(i) = \begin{cases} i \bmod 2 & N_{sb} = 1 \text{ and-intra-\&-inter-subframe-}hoppong \\ \text{CURRENT\_TX\_NB} \bmod 2 & N_{sb} = 1 \text{ and-inter-subframe-hopping} \\ c(i \cdot 10) & N_{sb} > 1 \end{cases}$$

$f_{hop}(i)$ : hopping-function $f_m(i)$ : function-(0-or-1)-determining-whether-mirroring-is-used The PUSCH hopping procedure of the UE is configured to perform hopping when 1 bit of a Frequency Hopping (FH) field of a DCI format 0 of a PDCCH is set to 1 and the type of UL resource block allocation is 0. Types of hopping are divided into a type 1 and a type 2, and a process for determining the type of hopping is expressed by Equation (3) below.

[Equation 3]

$$N_{RB}^{PUSCH} = \begin{cases} N_{RB}^{UL} - \tilde{N}_{RB}^{HO} - (N_{RB}^{UL} \bmod 2) & \text{type-1} \cdot PUSCH \cdot \text{hopping} \\ N_{RB}^{UL} & \text{type-2 } N_{sb} = 1 \; PUSCH \cdot \text{hopping} \\ N_{RB}^{UL} - \tilde{N}_{RB}^{HO} & \text{type-2 } N_{sb} > 1 \; PUSCH \cdot \text{hopping} \end{cases} \quad (3)$$

FIG. 2 illustrates a communication environment where a DL TP for a UE is identical to a UL RP for the same UE. A macro node 210 is an eNB/RU/RRH as a TP for transmitting a DL physical channel (i.e., PDCCH and/or PDSCH) and a DL physical signal to a UE 220. The macro node 210 is also an eNB/RU/RRH as an RP for receiving a UL physical channel and a UL physical signal (i.e., PUSCH/PUCCH/SRS and related RS) at the same UE. However, there are researches in progress for separately configuring an eNB/RU/RRH as the TP and as the RP for a user equipment in various CoMP scenarios, Meanwhile, there is a need for a technology for controlling UL frequency hopping for a COordinated Multi-Point transmission/reception system (CoMP system) or a heterogeneous network where two or more different transmission/reception points cooperatively transmit a signal. Typically, when an eNB/RU/RRH configured as a TP is different from an eNB/RU/RRH configured as an RP, i PUSCH collision may occur. Accordingly, there is a need for a technology for solving this problem.

Figure 3:
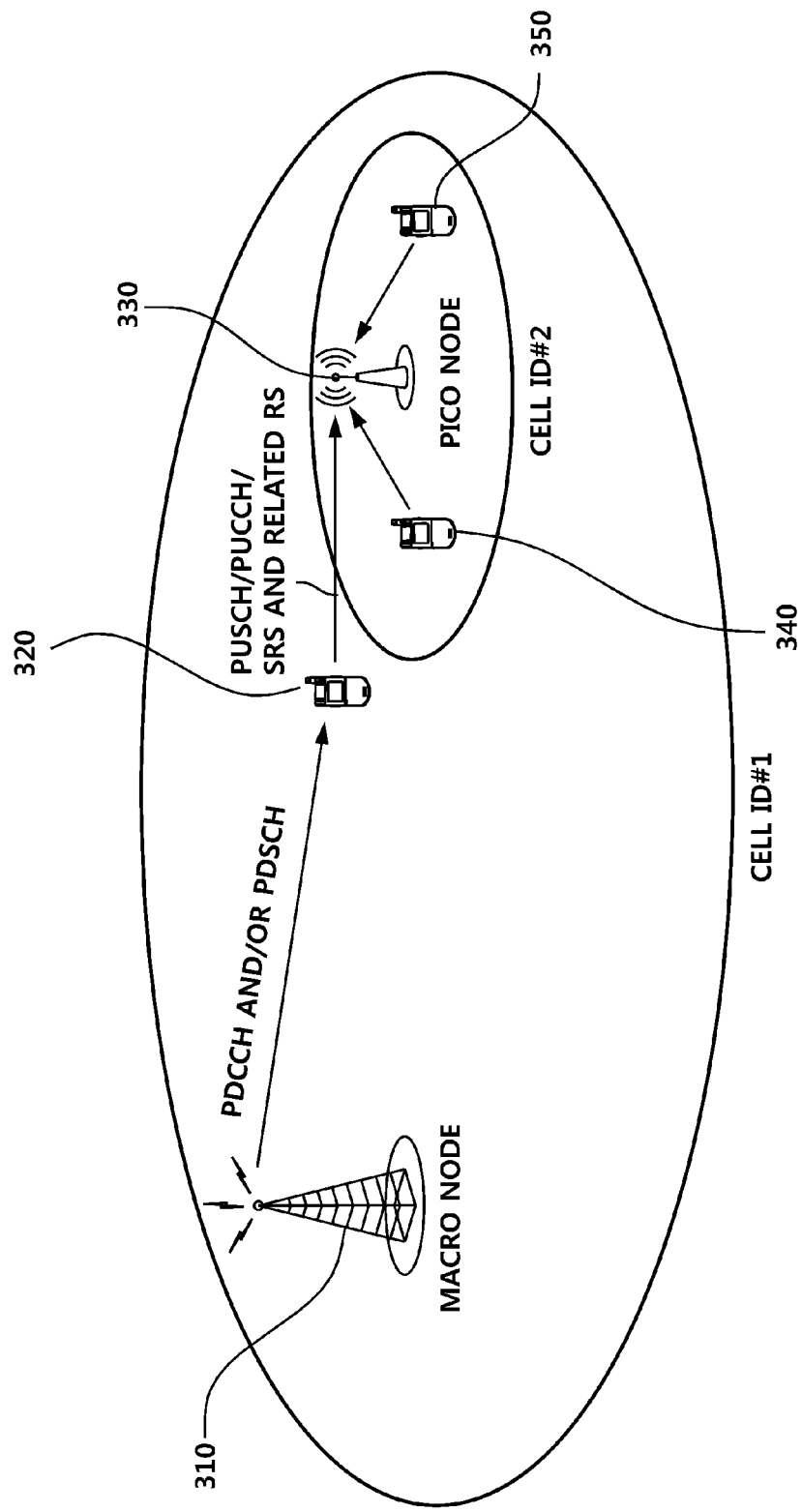
FIG. 3 illustrates a communication environment whether a downlink transmission point (TP) for a user equipment is different from an uplink reception point (RP) therefor.

FIG. 3 illustrates a communication environment where a DL TP for a UE is different from a UL RP for the same UE.

A UE located in a macrocell and a UE located in a boundary area of a pico/micro cell may be controlled to receive a DL physical channel and a DL physical signal from an eNB/RU/RRH of the macrocell and to transmit a UL physical channel and a UL physical signal to an eNB/RU/RRH of the pico/micro cell. Such a method has been considered an efficient method for reducing interference in uplink and lowering power consumption of the UE. In FIG. 3, a UE 320 receives a DL physical channel and a DL physical signal from a macro node 310, and transmits a UL physical channel and a UL physical signal to a pico node 330.

An eNB/RU/RRH, as a TP, transmits DL control information and DL data information for SIB2 including cell-specific RRC parameters related to PUSCH frequency hopping. Based on such DL control information and DL data information, an eNB/RU/RRH, as an RP, receives a PUSCH from the UE. Accordingly, mismatch occurs. In this case, hopping pattern is also mismatched between PUSCH transmission of a UE in a RP cell that directly receives a UL scheduling grant from an eNB/RU/RRH set as the RP and PUSCH transmission of a UE that transmits PUSCH to the RP after receiving a UL scheduling grant from another TP and. Such mismatch causes collision.

Figure 4:
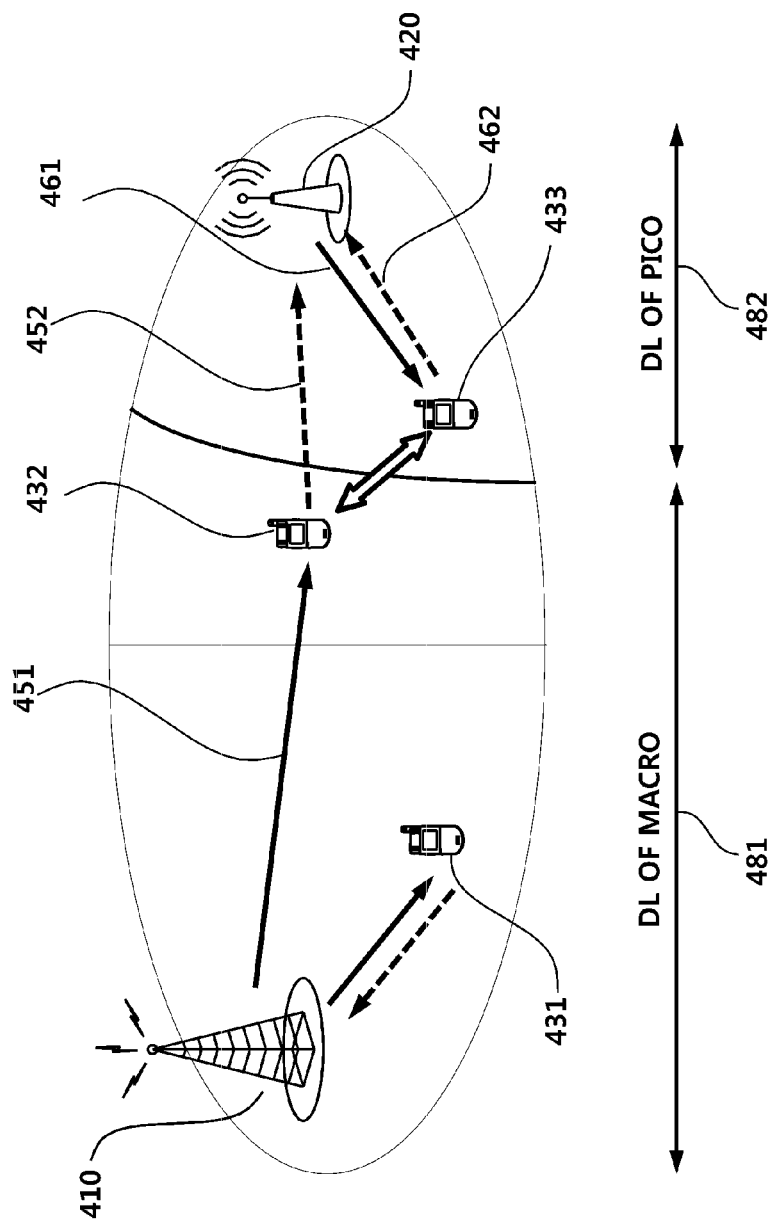
FIG. 4 illustrates a communication environment that may have a PUSCH collision between user equipments.

FIG. 4 illustrates a network having a PUSCH collision between UEs.

Reference numeral 481 indicates a DL range of a macro cell (i.e., DL macro), and reference numeral 482 indicates a DL range of a pico cell (i.e., DL pico).

Referring to FIG. 4, a UE2 432 receives a PUSCH hopping parameter from SIB2 of a macrocell 410 and receives a UL scheduling grant through a PDCCH (or an e-PDCCH) of the macrocell 410 as indicated by reference numeral 451. Accordingly, the UE2 432 transmits a PUSCH to a picocell 420 as indicated by reference numeral 452. A UE3 433 receives a PUSCH hopping parameter and a UL scheduling grant from a picocell 420 as indicated by reference numeral 461 and transmits a PUSCH to the picocell 420 as indicated by reference numeral 462.

Figure 5:
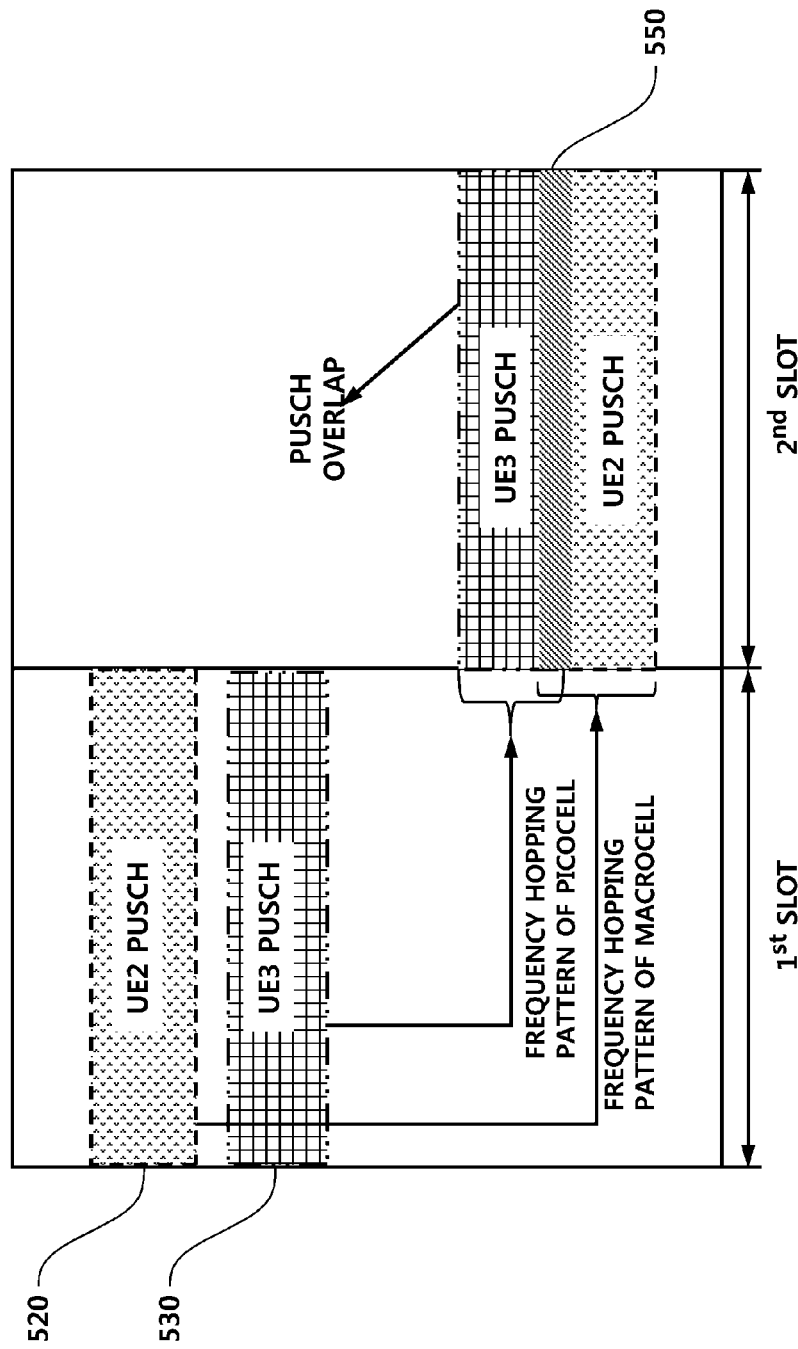
FIG. 5 illustrates a PUSCH collision between second user equipment (UE2) and third user equipment (UE3) of FIG. 4.

FIG. 5 illustrates an example of a PUSCH collision between UE2 and UE3 illustrated in FIG. 4. A difference in a PUSCH frequency hopping rule between a UE2 and a UE3 causes overlapping in a part of or entire a hopped PUSCH frequency region, as indicated by reference numeral 550. Thus, there is a possibility that PUSCH collision may occur. Specifically, when the UE2 and the UE3 transmit UL signals to the picocell, the PUSCH collision occurs as indicated by reference numeral 550 due to a difference in frequency hopping pattern between cells although a PUSCH 520 of the UE2 and a PUSCH 530 of the UE3 in a $1^{st}$ slot do not overlap each other.

In accordance with at least one embodiment of the present disclosure, a PUSCH hopping procedure is redefined for a UE that is set to have an eNB/RU/RRH as a TP different from an eNB/RU/RRH as an RP as described above in order to solve the above-described PUSCH collision problem.

Due to the introduction of Machine Type Communication (MTC) and the diffusion of smartphones, the number of UEs requiring a wireless connection abruptly increases and requirements for supporting a high data transmit rate for each UE rapidly increases. In order to efficiently manage allocated wireless resources and support a high transmit rate in such an environment, wireless operators try to maximize frequency reuse efficiency by separating a digital unit (DU) from a radio unit (RU)/remote radio head (RRH) and allowing each RU/RRH to form independent cell. Also, a heterogeneous network becomes common. In the heterogeneous network, each one of eNBs/RUs/RRHs has different cell size due to an imbalance of transmission power between eNBs/RUs/RRHs. Various CoMP techniques between eNBs/RUs/RRHs has been introduced to guarantee a high data transmit rate in such a heterogeneous network. In addition, a scheme for independently configuring UL and DL paths has been introduced due to an imbalance of coverage between UL and DL. For example, the independent configuration scheme independently configures an eNB/RU/RRH as a TP transmitting a DL signal for a UE and an eNB/RU/RRH as an RP receiving a UL signal from the UE.

However, when the eNB/RU/RRH as the TP for transmitting a DL physical channel and a DL physical signal to the UE and the eNB/RU/RRH as the RP for receiving a UL physical channel and a UL physical signal from the UE are separately configured as described above, ambiguity may occur in transmitting a UL physical channel and a UL physical signal, differently from the typical scenario in which an identical eNB/RU/RRH serves as the TP and the RP. Specifically, configuration information for the transmission of a UL physical channel and a UL physical signal is received from the eNB/RU/RRH which is the TP, whereas an actual UL physical channel and an actual UL physical signal are transmitted to another eNB/RU/RRH which is configured as the RP. Accordingly, a mismatch may occur between UL transmission-related configuration information and actual UL transmission by the UE. Particularly, in the case of the transmission of a PUSCH (e.g., a UL data channel), a cell-specific PUSCH frequency hopping procedure is defined for frequency diversity gain and interference randomization. Thus, collision may occur between PUSCHs scheduled per each UE when corresponding PUSCH hopping parameters are different.

According to the embodiments of the present disclosure, a frequency hopping procedure is newly defined for avoiding collision in PUSCH transmissions of UEs located within a corresponding RP cell when a UE having a TP different from an RP transmits a PUSCH (e.g., a UL data channel).

Hereinafter, a transmission point (TP) denotes any node (e.g., a node, a base station, a cell, an apparatus, an eNB) performing a macro node function and transmitting a downlink signal. A reception point (RP) denotes any node (e.g., a node, a cell, an apparatus) performing a pico node function and receiving an uplink signal.

Embodiment 1: Reconfiguration of UE-specific PUSCH Hopping Parameter

In accordance with the first embodiment (Embodiment 1), a cell/eNB/RU/RRH sets a PUSCH frequency hopping parameter for a UE belonging to the cell/eNB/RU/RRH to be UE-specific. According to the related art, PUSCH frequency hopping related RRC parameters (e.g., n-SB, hoppingMode and pusch-HoppingOffset) were commonly configured for all UEs in a cell through SIB2 of the cell. Accordingly, when the corresponding base station performs UL PUSCH scheduling on the UEs in the cell, a collision problem has been prevented due to a difference in PUSCH hopping pattern between the UEs.

However, in the CoMP scenario, an eNB/RU/RRH configured as a TP that configures the PUSCH frequency hopping-related RRC parameter for the optional UE through SIB2 is different from an eNB/RU/RRH configured as a RP that actually receives the transmission of a PUSCH from the relevant UE. Accordingly, a PUSCH collision may occur due to a difference in PUSCH hopping pattern between the PUSCH transmission of the relevant UE and the PUSCH transmission of another UE within the cell of the eNB/RU/RRH configured as the relevant RP.

In order to solve the PUSCH collision problem, in the first embodiment (Embodiment 1), when a UE is set to have an eNB/RU/RRH set as an RP different from an eNB/RU/RRH set as a TP, a PUSCH hopping parameter reconfiguration message is defined as a UE-specific RRC signaling that enables the corresponding TP eNB/RU/RRH to reconfigure a PUSCH frequency hopping parameter for the UE. The PUSCH hopping parameter reconfiguration message includes reconfiguration information of n-SB, hoppingMode, and pusch-HoppingOffset which are cell-specific hopping parameters transmitted through SIB2. Furthermore, an RP reconfiguration RRC message is newly defined. The RP reconfiguration RRC message includes reconfiguration information of a relevant PUSCH hopping parameter. That is, the RP reconfiguration RRC message includes the PUSCH hopping parameter reconfiguration value and a reconfiguration value of a parameter related to the generation of another UL channel and another UL signal.

When a UE receives the UE-specific PUSCH hopping parameter reconfiguration message, the UE flushes a cell-specific PUSCH hopping parameter configured through SIB2 on the basis of the received UE-specific PUSCH hopping parameter reconfiguration message, reconfigures the cell-specific PUSCH hopping parameter configured through SIB2 so as to have a value included in the relevant UE-specific PUSCH hopping parameter reconfiguration message, and performs PUSCH frequency hopping on the basis of the newly-configured parameter for transmitting a PUSCH according to the following UL scheduling grant. Alternatively, a time point for applying the new PUSCH hopping parameter may be defined after a time point when the UE transmits an RRC confirmation message in response to the UE-specific PUSCH hopping parameter reconfiguration message.

Figure 6:
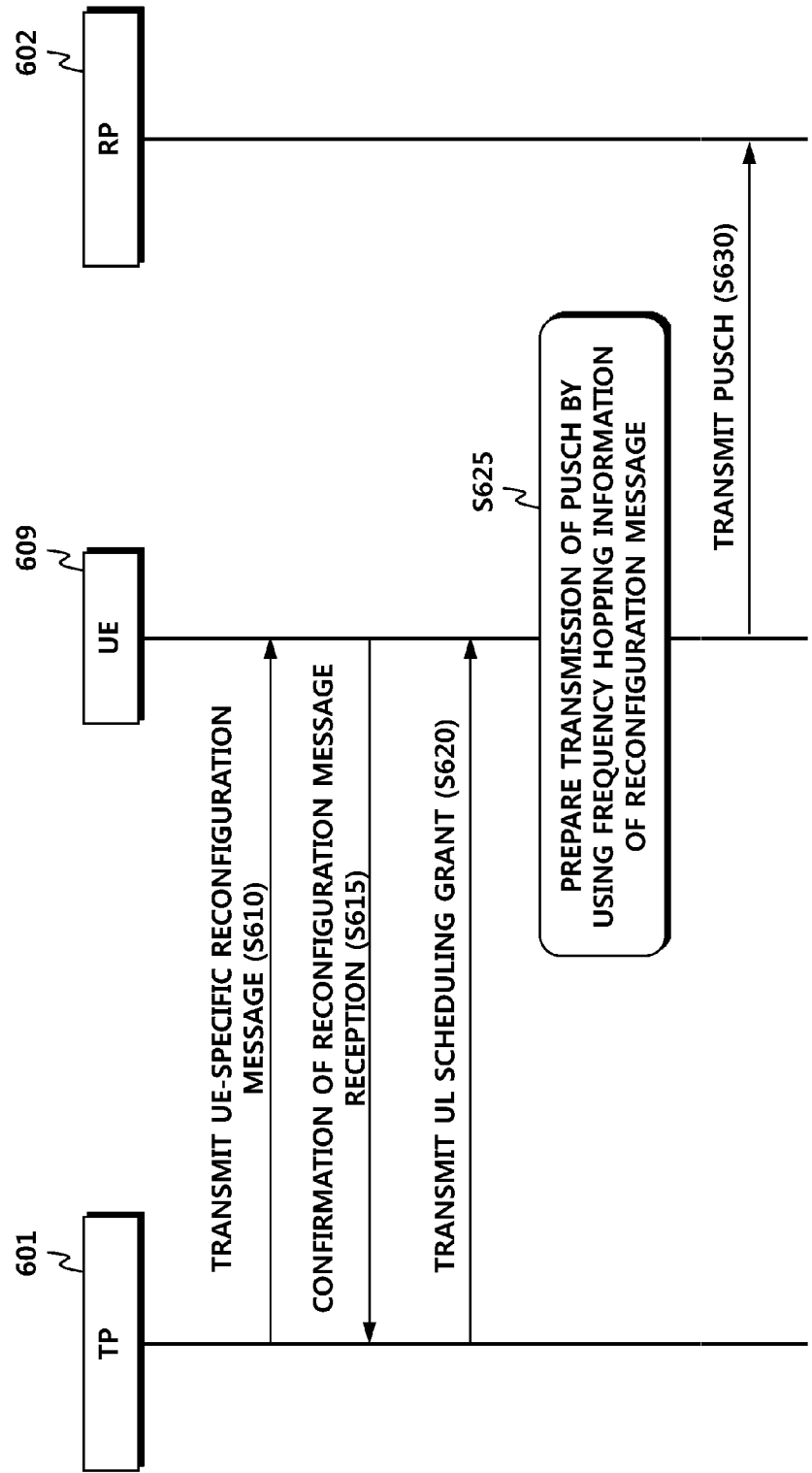
FIG. 6 is a view illustrating a first embodiment (Embodiment 1).

FIG. 6 is a view illustrating the first embodiment (Embodiment 1).

A TP 601 transmits a UE-specific reconfiguration message to a UE in step S601. The UE-specific reconfiguration message includes UE-specific RRC signaling, and the UE-specific RRC signaling includes PUSCH hopping parameter reconfiguration information. In step S620, the TP 601 transmits an UL scheduling grant to the UE 609. In step S625, the UE 609 prepares the transmission of a PUSCH on the basis of the message, namely, by using frequency hopping information included in the reconfiguration message, which has been received in step S610. PUSCH frequency hopping is performed on the basis of the newly-configured parameter, and the UE 609 transmits the PUSCH to an RP 602 in step S630. A time point for applying the hopping parameter may be after a time point of the transmission of the message in step S610. Also, as an example, the time point for applying the hopping parameter may be a time point of the transmission of an RRC confirmation message, and the reception of the RRC confirmation message may be confirmed in step S615. Step S615 may be selectively included.

Embodiment 2: Selection of UL Scheduling Grant-based RRC-configured Hopping Parameter A cell/eNB/RU/RRH may configure one or more multiple PUSCH frequency hopping parameter sets through UE-specific or cell-specific RRC signaling for a UE in the corresponding cell. In this case, a hopping parameter indication information location is defined for notifying that PUSCH hopping is to be performed by applying, to a UE receiving the relevant multiple PUSCH frequency hopping parameter sets, which parameter set from among multiple PUSCH frequency hopping parameter sets configured separately from an existing frequency hopping flag and existing hopping information bit(s) within a UL scheduling grant. The UE selects a PUSCH frequency hopping parameter set to be applied among RRC-configured multiple PUSCH frequency hopping parameter sets through the hopping parameter indication information location included in the UL scheduling grant.

After the UE receives relevant configuration information with respect to the multiple PUSCH frequency hopping parameter sets transmitted through the cell-specific or UE-specific RRC signaling, the UE may store additionally-received multiple frequency hopping sets in a PUSCH frequency hopping parameter set received through the existing SIB2. Alternatively, the UE may flush a parameter set configured through the existing SIB2 and may replace the flushed parameter set by the newly-configured multiple frequency hopping parameter sets. Each of the RRC-configured parameter sets includes a set ID, which is used to distinguish between the parameter sets, and n-SB, hoppingMode and pusch-HoppingOffset which are the frequency hopping parameters according to the set ID. A set ID of a parameter set to be applied is signaled to the hopping parameter indication information location of the UL scheduling grant.

In such second embodiment (Embodiment 2), additionally, in order to reduce the overload of the UL scheduling grant, the eNB/RU/RRH may be defined to activate or to deactivate the dynamic selection of the RRC-configured multiple PUSCH hopping parameter sets through the UL scheduling grant. In this case, only when the dynamic selection is activated, the eNB/RU/RRH includes, in the UL scheduling grant, a hopping parameter indication information location for selecting a parameter set to be applied among the configured multiple PUSCH hopping parameter sets. When the dynamic selection is deactivated, the eNB/RU/RRH does not include the information location in the UL scheduling grant. The dynamic selection may be activated or deactivated through MAC Control Element (CE) signaling or RRC signaling.

Figure 7:
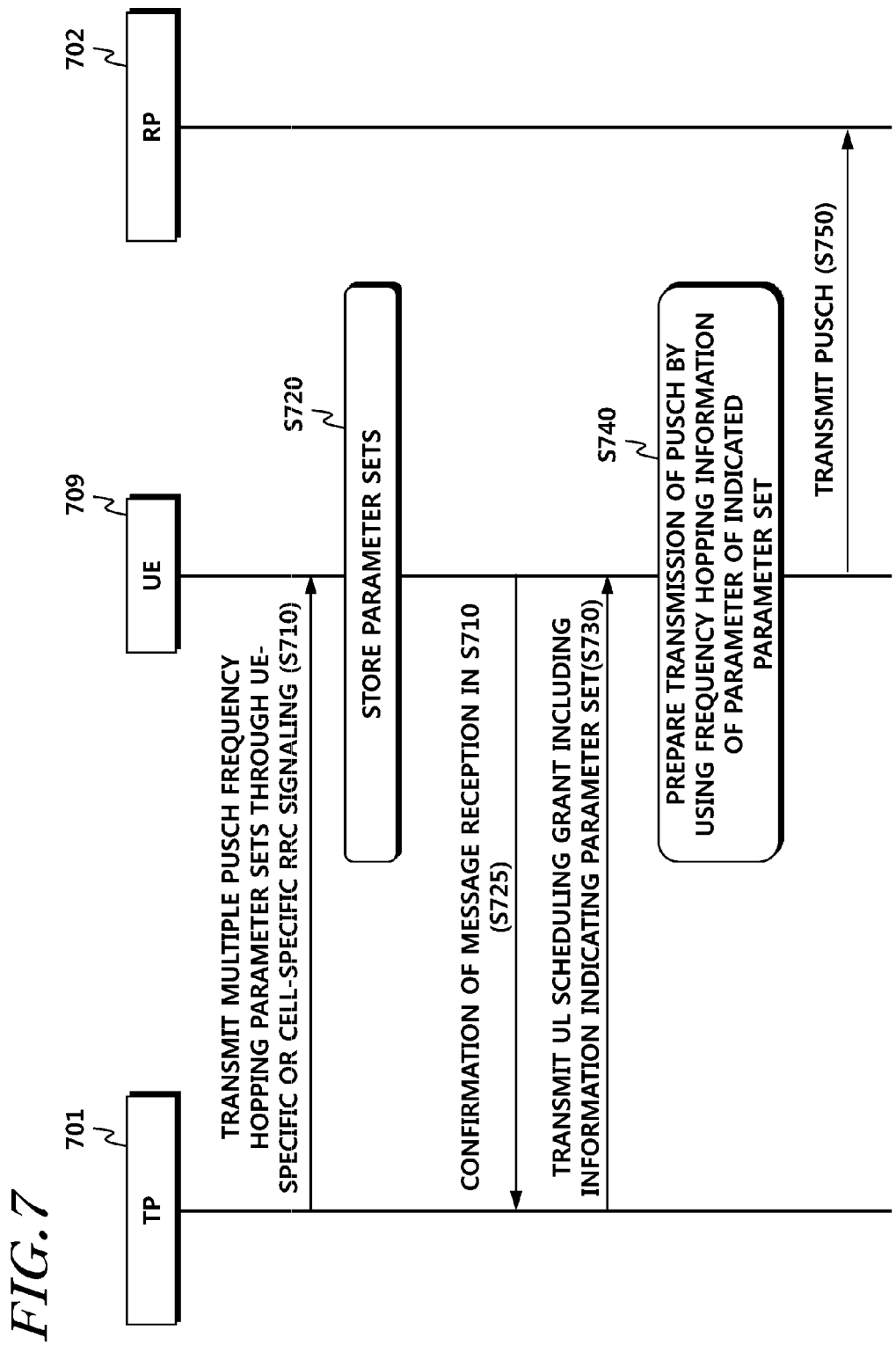
FIG. 7 is a view illustrating an example of a second embodiment (Embodiment 2).

FIG. 7 is a view illustrating an example of the second embodiment (Embodiment 2).

A TP 701 transmits two or more PUSCH frequency hopping parameter sets (i.e., multiple PUSCH hopping parameter sets) to a UE 709 through UE-specific or cell-specific RRC signaling in step S710. The UE 709 stores the parameter sets in step S720. When the parameter sets are transmitted through the UE-specific RRC signaling, the parameter sets may be different according to UEs. When the parameter sets are transmitted through the cell-specific RRC signaling, UEs in a cell may all have the same parameter sets. In this case, parameters within the common parameter sets may be indicated to the respective UEs in such a manner as to prevent the occurrence of a PUSCH collision due to the common parameter sets that the UEs all have. In step S725, the UE 709 selectively transmits the confirmation of the message reception in step S710.

In step S730, the TP 701 transmits a UL scheduling grant including information indicating a parameter set. In step S740, the UE 709 prepares the transmission of a PUSCH by using frequency hopping information of a parameter of the indicated parameter set. In step S750, the prepared transmission of the PUSCH is performed. The transmitted PUSCH is received by an RP 702.

Figure 8:
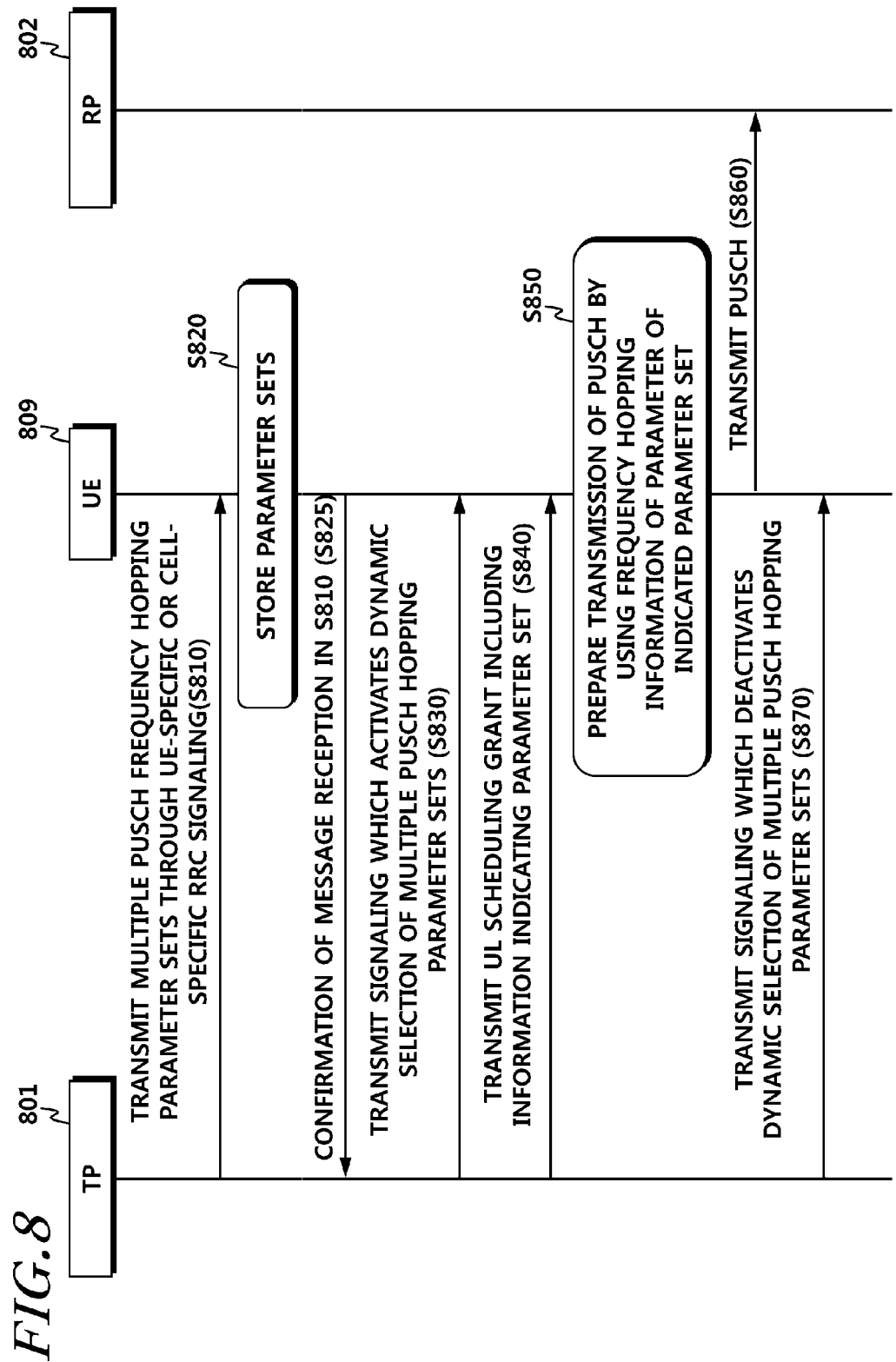
FIG. 8 is a view illustrating another example of a second embodiment (Embodiment 2).

FIG. 8 is a view illustrating another example of the second embodiment (Embodiment 2). Differently from FIG. 7, FIG. 8 illustrates that an example of instructing activation or deactivation is added. S810, S820 and S825 are identical to S710, S720 and S725 illustrated in FIG. 7, respectively, and thus the description thereof will be omitted. In step S830, a TP 801 transmits signaling which instructs activating the dynamic selection of multiple PUSCH hopping parameter sets. The signaling may be transmitted through MAC CE signaling or RRC signaling. After the dynamic selection is activated, in step S840, the TP 801 transmits a UL scheduling grant including information indicating a parameter set. In step S850, a UE 809 prepares the transmission of a PUSCH by using frequency hopping information of the indicated parameter set. In step S860, the UE 809 performs the prepared transmission of the PUSCH. The transmitted PUSCH is received by an RP 802.

In step S870, the TP 801 transmits signaling which instructs deactivating the dynamic selection of the multiple PUSCH hopping parameter sets. The signaling may be transmitted through MAC CE signaling or RRC signaling.

Embodiment 3: Configuration of Hopping Disabled Mode

A cell/eNB/RU/RRH may configure a PUSCH hopping disabled mode for a particular UE in the corresponding cell through UE-specific higher layer signaling. When the UE is configured with the PUSCH hopping disabled mode the UE operates in such a manner that intra & inter subframe PUSCH hopping is not unconditionally applied with respect to the allocated resource allocation information regardless of how a frequency hopping flag and hopping information bit(s) included in a UL scheduling grant are set.

In this case, the hopping disabled mode may be configured for the UE through UE-specific RRC signaling or MAC CE signaling.

Figure 9:
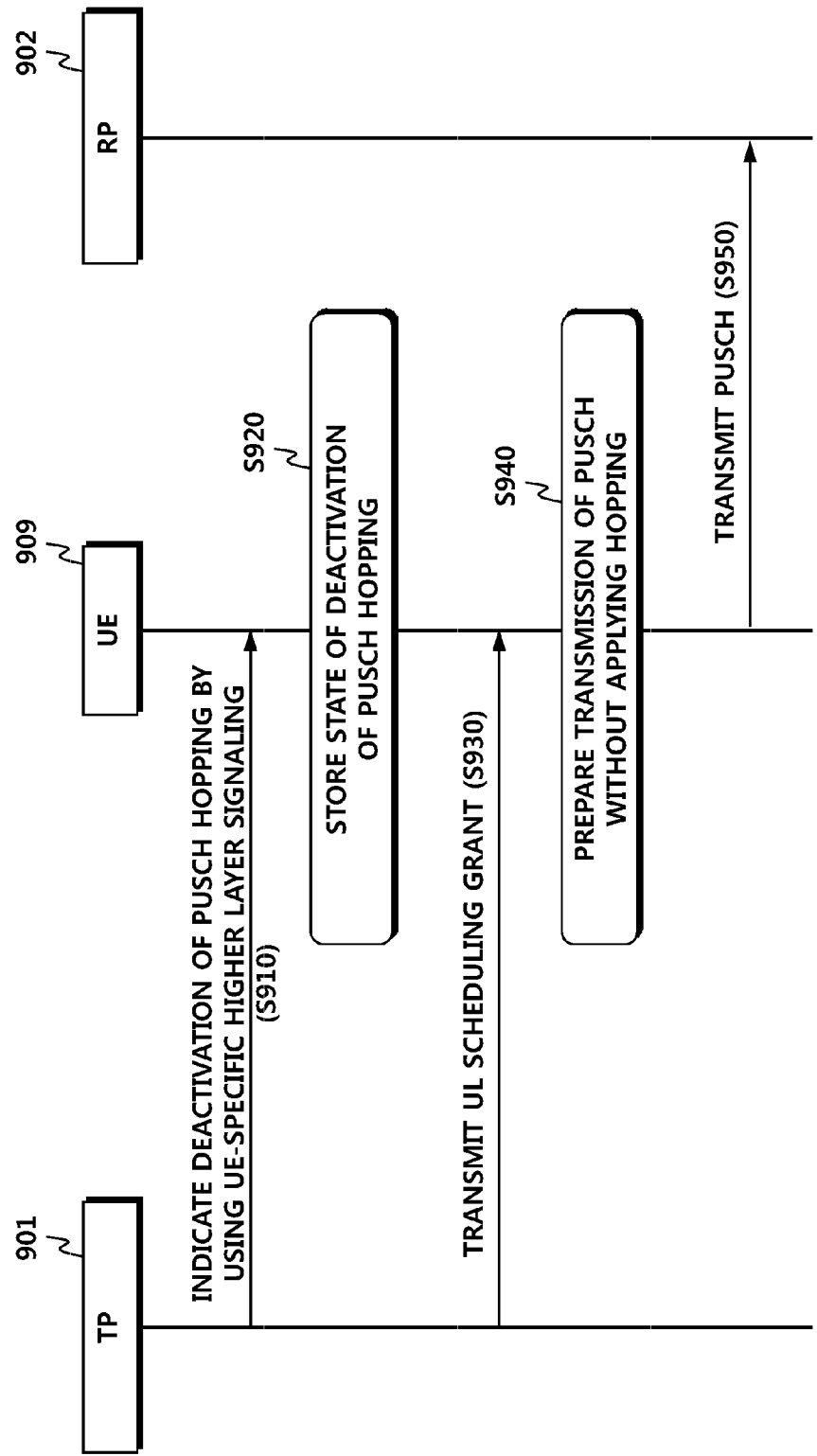
FIG. 9 is a view illustrating a third embodiment (Embodiment 3).

FIG. 9 is a view illustrating the third embodiment (Embodiment 3). Referring to FIG. 9, in step S910, a TP 901 instructs the deactivation of PUSCH hopping by using UE-specific higher layer signaling. In step S920, a UE 909 stores a state of the deactivation of the PUSCH hopping. When the UE 909 receives a UL scheduling grant transmitted by the TP 901 in step S930, the UE 909 prepares the transmission of a PUSCH without applying hopping in step S940, and transmits the PUSCH to an RP 902.

Figure 10:
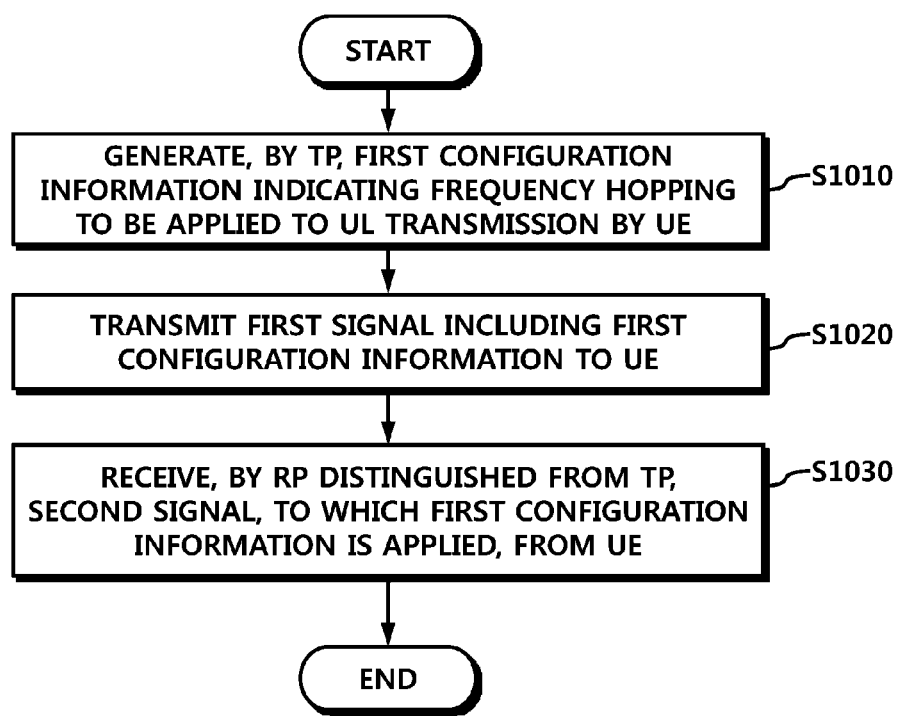
FIG. 10 illustrates operations of a transmission point (TP) according to an embodiment of the present disclosure.

FIG. 10 illustrates operations of a TP according to an embodiment of the present disclosure.

In order to control UL transmission, in step S1010, a TP generates first configuration information indicating frequency hopping to be applied to UL transmission by a UE. In step S1020, the TP transmits, to the UE, a first signal including the first configuration information. In step S1030, an RP different from the TP receives a second signal, to which the first configuration information is applied, from the UE. An example of the second signal corresponds to a PUSCH.

In the case of FIG. 6 illustrating the first embodiment (Embodiment 1), the first configuration information may be a UE-specific reconfiguration message which reconfigures a PUSCH hopping parameter of the UE. In the case of FIG. 7 illustrating the second embodiment (Embodiment 2), the first configuration information may be information including PUSCH hopping parameter sets configurable for the UE. After step S1020, the TP may include, in a UL scheduling grant of the UE, information indicating a hopping parameter of one of the PUSCH hopping parameter sets, and may transmit, to the UE, the UL scheduling grant including the information. Alternatively, as illustrated in FIG. 8, after step S1020, the TP may transmit signaling, which activates or deactivates the dynamic selection of the parameter sets, to the UE. Alternatively, in the case of FIG. 9 illustrating the third embodiment (Embodiment 3), the first configuration information may be information instructing the deactivation of the PUSCH hopping of the UE.

Figure 11:
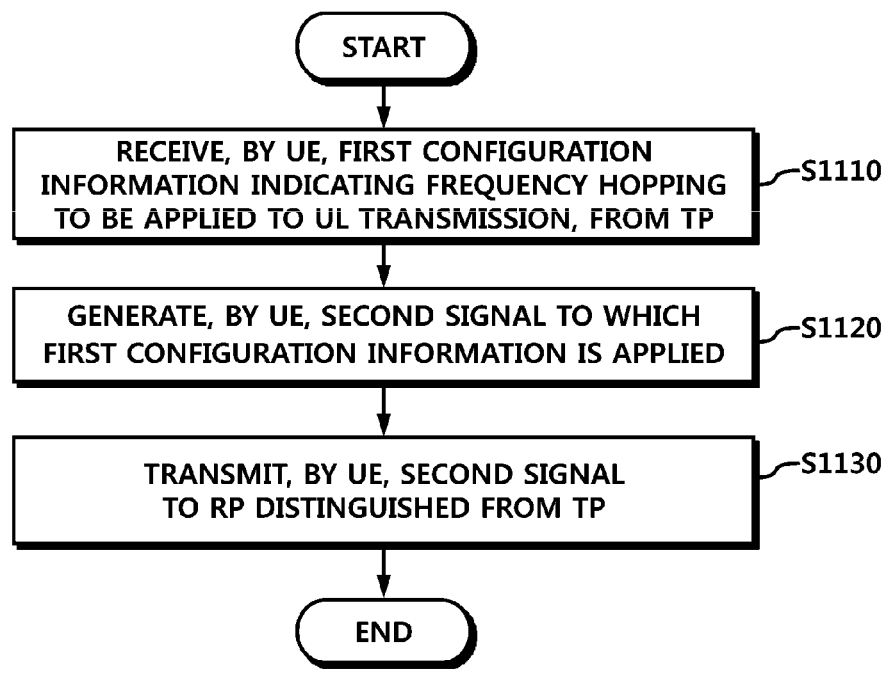
FIG. 11 illustrates operations of a user equipment according to an embodiment of the present disclosure.

FIG. 11 illustrates operations of a UE according to an embodiment of the present disclosure.

In order to control UL transmission, in step S1110, the UE receives, from a TP, first configuration information indicating frequency hopping to be applied to the UL transmission. In step S1120, the UE generates a second signal, to which the first configuration information is applied. In step S1130, the UE transmits the second signal to an RP different from the TP. An example of the second signal corresponds to a PUSCH.

In the case of FIG. 6 illustrating the first embodiment (Embodiment 1), the first configuration information may be a UE-specific reconfiguration message which reconfigures a PUSCH hopping parameter of the UE. In the case of FIG. 7 illustrating the second embodiment (Embodiment 2), the first configuration information may be information including PUSCH hopping parameter sets configurable for the UE. After step S1110, the UE may receive a UL scheduling grant including information indicating a hopping parameter of one of the PUSCH hopping parameter sets. Alternatively, as illustrated in FIG. 8, after step S1110, the UE may receive, from the TP, signaling which activates or deactivates the dynamic selection of the parameter sets. Alternatively, in the case of FIG. 9 illustrating Embodiment 3, the first configuration information may be information instructing the deactivation of the PUSCH hopping of the UE.

The embodiments of the present disclosure relate to a PUSCH hopping procedure for a UE. Particularly, the present disclosure proposes the method for solving the problems in the PUSCH frequency hopping procedure which may occur when the eNB/RU/RRH as the TP for the UE and the eNB/RU/RRH as the RP therefor are differently configured in an environment where the scenario of the CoMP heterogeneous network becomes common. Through this proposal, even in the scenario of the CoMP heterogeneous network, the present disclosure provides the basis of a method and an apparatus for transmitting a PUSCH which can improve system performance in the UL in such a manner that the system adaptively configures the eNB/RU/RRH as the RP for the UE according to a UL channel environment of the UE.

Figure 12:
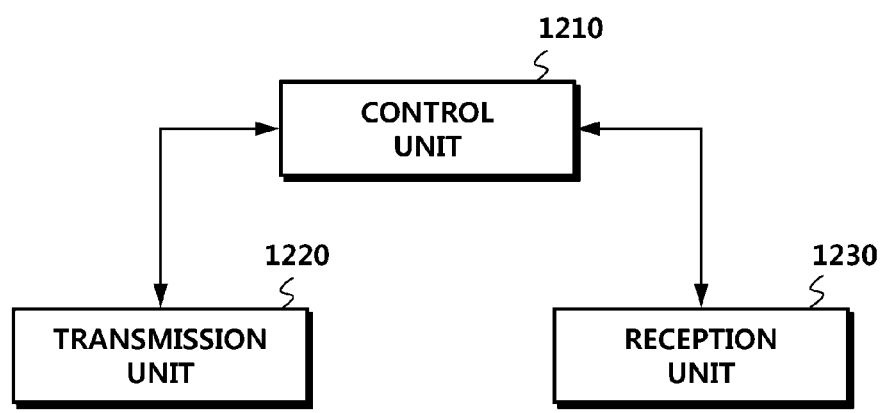
FIG. 12 is a block diagram illustrating a transmission point (TP) according to an embodiment of the present disclosure.

FIG. 12 is a block diagram illustrating a TP according to an embodiment of the present disclosure. As described above, the TP may perform functions of a base station, a cell, an apparatus, an eNB, a macro node, and the like, or may transmit a DL signal.

Referring to FIG. 12, the TP 1200 according to an embodiment of the present disclosure may include a control unit 1210, a transmission unit 1220, and a reception unit 1230.

The control unit 1210 controls an overall operation of the TP according to the PUSCH hopping procedure for the UE necessary to perform the above-described embodiments of the present disclosure.

The transmission unit 1220 and the reception unit 1230 are used to transmit and receive signals, messages, or data, which are necessary to perform the above-described embodiments of the present disclosure, to/from the UE.

More specifically, the TP 1200 illustrated in FIG. 12 controls UL transmission, the reception unit 1230 receives a signal from the UE, and the control unit 1210 generates first configuration information indicating frequency hopping which is to be applied to UL transmission by the UE. The transmission unit 1220 transmits, to the UE, a first signal including the first configuration information. Then, an RP distinguished from the TP receives a second signal, to which the first configuration information is applied, from the UE. An example of the second signal corresponds to a PUSCH.

In the case of FIG. 6 illustrating the first embodiment (Embodiment 1), the first configuration information may be a UE-specific reconfiguration message which reconfigures a PUSCH hopping parameter of the UE. In the case of FIG. 7 illustrating the second embodiment (Embodiment 2), the first configuration information may be information including PUSCH hopping parameter sets configurable for the UE. The control unit 1210 may perform a control operation for generating information indicating a hopping parameter of one of the PUSCH hopping parameter sets and including the generated information in a UL scheduling grant of the UE, and may control the transmission unit 1220 to transmit the UL scheduling grant including the information to the UE. Alternatively, as illustrated in FIG. 8, the control unit 1210 may control the transmission unit 1220 to transmit signaling, which activates or deactivates the dynamic selection of the parameter sets, to the UE. Alternatively, in the case of FIG. 9 illustrating Embodiment 3, the first configuration information may be information instructing the deactivation of the PUSCH hopping of the UE.

Figure 13:
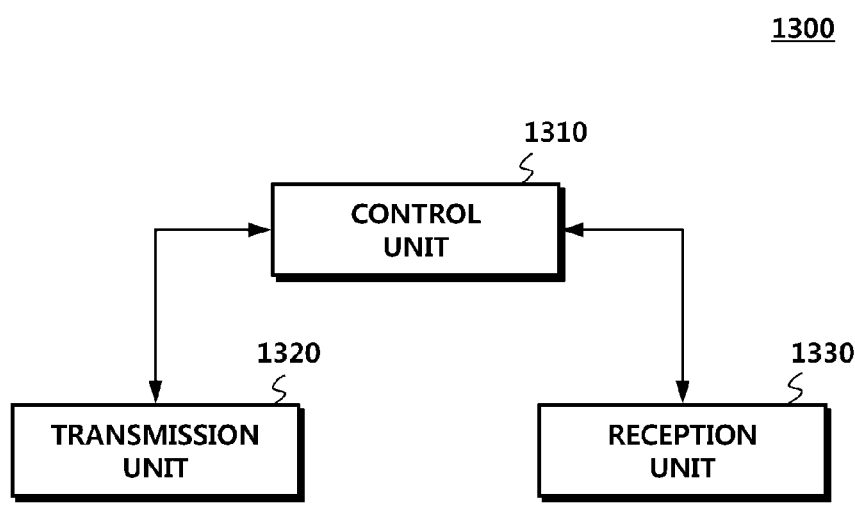
FIG. 13 is a diagram illustrating a user equipment according to an embodiment of the present disclosure.

FIG. 13 is a block diagram illustrating a UE according to an embodiment of the present disclosure.

Referring to FIG. 13, the UE 1300 according to an embodiment of the present disclosure includes a reception unit 1330, a control unit 1310, and a transmission unit 1320.

The reception unit 1330 receives DL control information, data and a message from the TP through a relevant channel.

Also, the control unit 1310 controls an overall operation of the UE according to the PUSCH hopping procedure for an optional UE necessary to perform the above-described embodiments of the present disclosure.

The transmission unit 1320 transmits UL control information and a data message to the base station through a channel.

More specifically, the UE 1300 illustrated in FIG. 13 controls UL transmission, the transmission unit 1320 transmits a signal, and the reception unit 1330 receives first configuration information indicating frequency hopping, which is to be applied to the UL transmission, from the TP. The control unit 1310 generates a second signal to which the first configuration information is applied, and the transmission unit 1320 transmits the second signal to the RP different from the TP. An example of the second signal is a PUSCH.

In the case of FIG. 6 illustrating the first embodiment (Embodiment 1), the first configuration information may be a UE-specific reconfiguration message which reconfigures a PUSCH hopping parameter of the UE. In the case of FIG. 7 illustrating the second embodiment (Embodiment 2), the first configuration information may be information including PUSCH hopping parameter sets configurable for the UE, and the reception unit 1330 may receive a UL scheduling grant including information indicating a hopping parameter of one of the PUSCH hopping parameter sets. Alternatively, as illustrated in FIG. 8, the reception unit 1330 may receive, from the TP, signaling which activates or deactivates the dynamic selection of the parameter sets. Alternatively, in the case of FIG. 9 illustrating Embodiment 3, the first configuration information may be information instructing the deactivation of the PUSCH hopping of the UE.

In the case of applying embodiments of the present disclosure, when a PUSCH is transmitted which is a UL data channel of the UE set to have different eNBs/RUs/RRHs as the TP and the RP, the frequency hopping procedure may be implemented to avoid collision in transmissions of PUSCHs by UEs located within the relevant RP cell.

Although the embodiments of the present disclosure have been described for illustrative purposes, those skilled in the art will appreciate that various modifications, additions and substitutions are possible, without departing from the scope and spirit of the invention. Therefore, exemplary embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

The invention claimed is:

1. A method for controlling uplink transmission in a mobile communication network by a transmission point, the method comprising:

generating, by the transmission point, first configuration information indicating frequency hopping to be newly applied to uplink transmission of a user equipment when a reception point to receive the uplink transmission of the user equipment is different from the transmission point performing a downlink transmission to the user equipment, wherein the first configuration information includes Physical Uplink Shared CHannel (PUSCH) hopping parameter sets configurable for the user equipment;

transmitting, by the transmission point, a first signal including the first configuration information to the user equipment; and transmitting, by the transmission point to the user equipment, an uplink scheduling grant including information indicating, among the PUSCH hopping parameter sets, one set to be applied to a frequency hopping reconfiguration for the uplink transmission of the user equipment when a dynamic parameter set selection mode is activated in the user equipment, wherein the reception point receives, from the user equipment, a second signal to which a frequency hopping parameter selected based on the set indication information included in the uplink scheduling grant is applied; and wherein the dynamic parameter set selection mode is activated or deactivated by transmitting signaling for activating or deactivating the dynamic parameter set selection mode to the user equipment.

2. The method as claimed in claim 1, wherein the first configuration information includes one of a user equipment-specific reconfiguration message for reconfiguring a PUSCH hopping parameter of the user equipment and a reception point reconfiguration Radio Resource Control (RRC) message including a PUSCH hopping parameter reconfiguration value of the user equipment.

3. The method as claimed in claim 1, wherein:
the transmitting the uplink scheduling grant is performed after the transmitting of the first signal including the first configuration information, and
the transmitting the uplink scheduling grant comprises including the information indicating the one set of the PUSCH hopping parameter sets in an information location separately defined in an uplink scheduling grant of the user equipment, and transmitting the uplink scheduling grant including the information to the user equipment.

4. The method as claimed in claim 1, wherein the first configuration information includes information that instructs deactivation of PUSCH hopping of the user equipment.

5. The method as claimed in claim 1, wherein the PUSCH hopping parameter sets are transmitted through a user equipment (UE)-specific RRC signaling or a cell-specific RRC signaling.

6. The method as claimed in claim 1, wherein:
each of the PUSCH hopping parameter sets includes a set identification (ID) and at least one corresponding frequency hopping parameter; and
the information indicating the one set to be applied to the frequency hopping reconfiguration includes the set ID.

7. A method for controlling uplink transmission in a mobile communication network by a user equipment, the method comprising:
receiving, by the user equipment, first configuration information indicating frequency hopping to be newly applied to uplink transmission from a transmission point when a reception point to receive the uplink transmission of the user equipment is different from the transmission point performing a downlink transmission to the user equipment, wherein the first configuration information includes Physical Uplink Shared CHannel (PUSCH) hopping parameter sets configurable for the user equipment;
receiving, by the user equipment from the transmission point, an uplink scheduling grant including information indicating, among the PUSCH hopping parameter sets, one set to be applied to a frequency hopping reconfiguration for the uplink transmission of the user equipment, when a dynamic parameter set selection mode is activated in the user equipment;
selecting, by the user equipment, a frequency hopping parameter to be applied to the uplink transmission to the reception point, based on the set indication information included in the uplink scheduling grant; and
transmitting, by the user equipment, a second signal, to which the selected frequency hopping parameter is applied, to the reception point different from the transmission point,
wherein the dynamic parameter set selection mode is activated or deactivated by receiving signaling for activating or deactivating the dynamic parameter set selection mode from the transmission point.

8. The method as claimed in claim 7, wherein the first configuration information includes one of a user equipment-specific reconfiguration message for reconfiguring a PUSCH hopping parameter of the user equipment, and a reception point reconfiguration Radio Resource Control (RRC) message including a PUSCH hopping parameter reconfiguration value of the user equipment.

9. The method as claimed in claim 7, wherein:
the receiving the uplink scheduling grant is performed after the receiving of the first configuration information; and
the set indication information is included in an information location separately defined in the uplink scheduling grant.

10. The method as claimed in claim 7, wherein the first configuration information includes information instructing deactivation of PUSCH hopping of the user equipment.

11. The method as claimed in claim 7, wherein the PUSCH hopping parameter sets are transmitted through a user equipment (UE)-specific RRC signaling or a cell-specific RRC signaling.

12. The method as claimed in claim 7, wherein:
each of the PUSCH hopping parameter sets includes a set identification (ID) and at least one corresponding frequency hopping parameter; and
the information indicating the one set to be applied to the frequency hopping reconfiguration includes the set ID.

13. A user equipment comprising:
a transmission unit configured to transmit a signal;
a reception unit configured to:
(i) receive first configuration information indicating frequency hopping to be newly applied to uplink transmission from a transmission point when a reception point to receive the uplink transmission of the user equipment is different from the transmission point performing a downlink transmission to the user equipment, wherein the first configuration information includes Physical Uplink Shared CHannel (PUSCH) hopping parameter sets configurable for the user equipment; and
(ii) receive, from the transmission point, an uplink scheduling grant including information indicating, among the PUSCH hopping parameter sets, one set to be applied to a frequency hopping reconfiguration for the uplink transmission of the user equipment, when a dynamic parameter set selection mode is activated in the user equipment; and
a control unit configured to select a frequency hopping parameter to be applied to the uplink transmission to the reception point, based on the set indication information included in the uplink scheduling grant, and to generate a second signal to which the selected frequency hopping parameter is applied, wherein the transmission unit is configured to transmit the second signal to the reception point different from the transmission point; and wherein the dynamic parameter set selection mode is activated or deactivated by receiving signaling for activating or deactivating the dynamic parameter set selection mode from the transmission point.

14. The user equipment as claimed in claim 13, wherein the first configuration information includes one of a user equipment-specific reconfiguration message for reconfiguring a PUSCH hopping parameter of the user equipment and a reception point reconfiguration Radio Resource Control (RRC) message including a PUSCH hopping parameter reconfiguration value of the user equipment.

15. The user equipment as claimed in claim 13, wherein:
the reception unit is configured to receive, from the transmission point, the uplink scheduling grant including the information indicating the one set of the PUSCH hopping parameter sets after the reception unit receives the first configuration information; and the set indication information is included in an information location separately defined in the uplink scheduling grant.

16. The user equipment as claimed in claim 13, wherein the first configuration information includes information instructing deactivation of PUSCH hopping of the user equipment.

17. The user equipment as claimed in claim 13, wherein the PUSCH hopping parameter sets are transmitted through a user equipment (UE)-specific RRC signaling or a cell-specific RRC signaling.

18. The user equipment as claimed in claim 13, wherein:
each of the PUSCH hopping parameter sets includes a set identification (ID) and at least one corresponding frequency hopping parameter; and the information indicating the one set to be applied to the frequency hopping reconfiguration includes the set ID.

* * * * *